United States Patent [19]

Ermel et al.

[11] Patent Number: 5,835,094

[45] Date of Patent: Nov. 10, 1998

[54] THREE-DIMENSIONAL COMPUTER ENVIRONMENT

[75] Inventors: Keith Ermel, Sherman Oaks; Bradley B. Hartfield, San Francisco; Mark D. Moore, Palo Alto; Geoffrey A. Zawolkow, San Carlos, all of Calif.

[73] Assignee: Compaq Computer Corporation, Houston, Tex.

[21] Appl. No.: 853,331

[22] Filed: May 7, 1997

Related U.S. Application Data

[63] Continuation of Ser. No. 775,489, Dec. 31, 1996, abandoned.

[51] Int. Cl.⁶ ............................... G06F 3/14; G06T 15/20
[52] U.S. Cl. .......................... 345/355; 345/349; 345/976; 345/356; 345/357; 345/419; 345/427; 345/339
[58] Field of Search ..................................... 345/355, 349, 345/976, 339, 351, 350, 356, 357, 348, 346, 334, 427, 419

[56] References Cited

U.S. PATENT DOCUMENTS

| | | |
|---|---|---|
| 5,295,243 | 3/1994 | Robertson et al. ...................... 345/348 |
| 5,303,388 | 4/1994 | Kreitman et al. ....................... 345/348 |
| 5,381,158 | 1/1995 | Takahara et al. ................... 345/419 X |
| 5,528,735 | 6/1996 | Strasnick et al. ....................... 345/427 |
| 5,546,529 | 8/1996 | Bowers et al. .......................... 345/348 |
| 5,555,354 | 9/1996 | Strasnick et al. ....................... 345/427 |
| 5,592,605 | 1/1997 | Asuma et al. .......................... 345/348 |
| 5,621,906 | 4/1997 | O'Neill et al. .......................... 345/355 |
| 5,632,022 | 5/1997 | Warren et al. .......................... 345/350 |

*Primary Examiner*—Raymond J. Bayerl
*Attorney, Agent, or Firm*—Fish & Richardson P.C.

[57] ABSTRACT

A method for displaying information about computer files to a user on a display in an environment simulating three dimensional space includes displaying a category of files as a container having a size related to its distance from a predefined portion of the display.

44 Claims, 12 Drawing Sheets

THREE-DIMENSIONAL COMPUTER ENVIRONMENT

This is a continuation of U.S. application Ser. No. 08/775,489, entitled THREE-DIMENSIONAL COMPUTER ENVIRONMENT, filed on Dec. 31, 1996, now abandoned.

BACKGROUND

This invention relates to graphical computer user interfaces.

Graphical computer user interfaces generally depict a virtual "desktop" environment onto which are placed small symbols, or icons, of applications, documents, and other files. These interfaces also generally have (e.g., in the Windows™ or Macintosh™ operating system (OS)) a file manager system that displays lists of files stored within a computer's storage devices (e.g., hard disk drive or floppy disk drive). Since files are generally stored in hierarchical directory fashion, the file manager systems typically arrange these files for display purposes as a series of folders and sub-folders. The folders and sub-folders are often displayed to the user as a set of nested rectangular windows, each folder window able to contain icons of both files (applications and documents) and sub-folders. Mouse-clicking on a sub-folder icon within a first window opens it as a new rectangular window on the desktop, displaying its own files and sub-folder icons.

These windowed graphical user environments typically only display those folders and those files that a user has opened, and display these folders as a series of often overlapping windows, where newly opened windows obscure contents of previously opened windows located "beneath". Windowed graphical user environments typically do not allow a user to see all available folders and documents at once, but instead require that the user traverse the hierarchically-nested series of folders and sub-folders to open a particular folder of interest.

SUMMARY

In general, in one aspect, the invention features a method for displaying information about computer files to a user on a display in an environment simulating three dimensional space including displaying a category of files as a container having a size related to its distance from a predefined portion of the display.

Embodiments of the invention may include the following features. An icon of a file belonging to the category of files can be displayed on a region of the container. The size can increase with distance from the predefined portion of the display. The predefined portion of the display can be the top of the display. The predefined portion of the display can be an imaginary horizon line of the display. The icon of the file can have a size related to its distance from the predefined portion of the display, and the size of the icon of the file can increase with distance from the predefined portion of the display. The region of the container can be rendered to appear substantially planar, which can be on what appears to be the upper side of the container. The file can be a document or an executable program. Two files can be displayed on a region of the container, where the first file is a document and the second file is an executable program.

A user can operate upon the first file with the second file by dragging the first file to the second file. A subcategory of files can be displayed as a stack on a region of the container. The stack can be opened, in response to the user selecting the stack, and displaying the stack as a sub-container, with icons of the files of the stack displayed on a region of the sub-container. The region of the sub-container can be rendered to appear substantially planar.

A number of categories of files can be displayed as similarly-configured containers, the containers having sizes related to their respective distances from the top portion of the display. A larger container can exchange position and size with a smaller container in response to the user selecting one of the containers. The larger container can be the largest container. The selected container can be the smaller container. A file can be moved from a first container to a second container in response to user selection, which can be selecting the file located on the first container and dragging the file to the second container, or selecting the file located on the first container and selecting the second container.

The container can resemble a desk and the file can resemble a sheet of paper, and the stack can resemble a stack of papers. The container can resemble a space port and the file can resemble a space ship, and the stack can resemble a cluster of space ships. The container can resemble a piece of land and the file can resemble an animal, and the stack can resemble a cluster of animals. The container can resemble a piece of land, and the file can resemble an egg, and the stack can resemble a nest of eggs. The container can resemble a golf course green and the file can resemble a golf ball, and the stack can resemble a cluster of golf balls. The container can resemble a photo album and the file can resemble a photograph, and the stack can resemble a stack of photographs.

In general, in another aspect, the invention features a method for displaying information about computer files to a user on a display in an environment simulating three-dimensional space including displaying a category of files as a container, the container having a size related to its distance from a predefined portion of the display, displaying an icon of a file belonging to the category of files on a region of the container, and displaying a subcategory of files as a stack on a region of the container, where the stack opens in response to the user selecting the stack, and displays the stack as a sub-container, icons of the files of the stack displayed on a region of sub-container.

In general, in another aspect, the invention features apparatus for displaying information about computer files to a user on a display in an environment simulating three-dimensional space including a shell program stored in a memory of the computer, and a metaphor engine stored in a memory of the computer and coupled to the shell program, the metaphor engine displaying a category of files on the display as a container, the container having a size related to its distance from a predefined portion of the display.

Embodiments of the invention may include the following features. The metaphor engine can include a substrate manager that builds an internal representation of the file system and a user interface manager that displays the internal representation of the file system on the display. The internal representation of the file system can include a master tree. The metaphor engine can display an icon of a file belonging to the category of files on a region of the container. The size of the container can increase with distance from the predefined portion of the display. The metaphor engine can display a subcategory of files as a stack on a region of the container. The metaphor engine can opens the stack, in response to the user selecting the stack, and display the stack as a sub-container, icons of the files of the stack displayed on a region of the sub-container.

The advantages of the invention may include one or more of the following. A computer user can see a complete view of all available folders and files, where least-used folders recede to a synthetic "distance" within a depicted three-dimensional space on the computer display. The computer user can thereby use perspective, and the perceived proximity of folders and files, to indicate the priority of each item. Intuitive selection techniques allow receding folders to be brought forward, so that a user may operate upon applications, documents, and other files within that folder. By bringing folders to and from a first, closest position, to the user, rather than vice-versa, the computer user does not need to navigate over or through a series of files in space. Having a fixed position for the computer user thereby can reduce feelings of disorientation or "sea-sickness" that can accompany such navigation.

A number of intuitively-shaped container types can be provided for selection by the user. The depicted three-dimensional space of the user environment can mimic the contents of the computer hard disk drive, and provide a user with easy access of all files. By having a synthetic three-dimensional space that is convex, that is that either does not have bounding walls, or has walls that open outward, not convexly inward, the environment can open and inviting to a computer user. Having one fixed area of the environment (e.g., the tool tray) that remains with the user as folders and files are brought to and away from the user provides a point of grounding for the user as he or she interacts with the three-dimensional environment. Any number of environment themes can be used so that a person can use the computer in a style natural to him or her.

Other features and advantages of the invention will become apparent from the following description and from the claims.

DRAWINGS

DESCRIPTION

Figure 1:
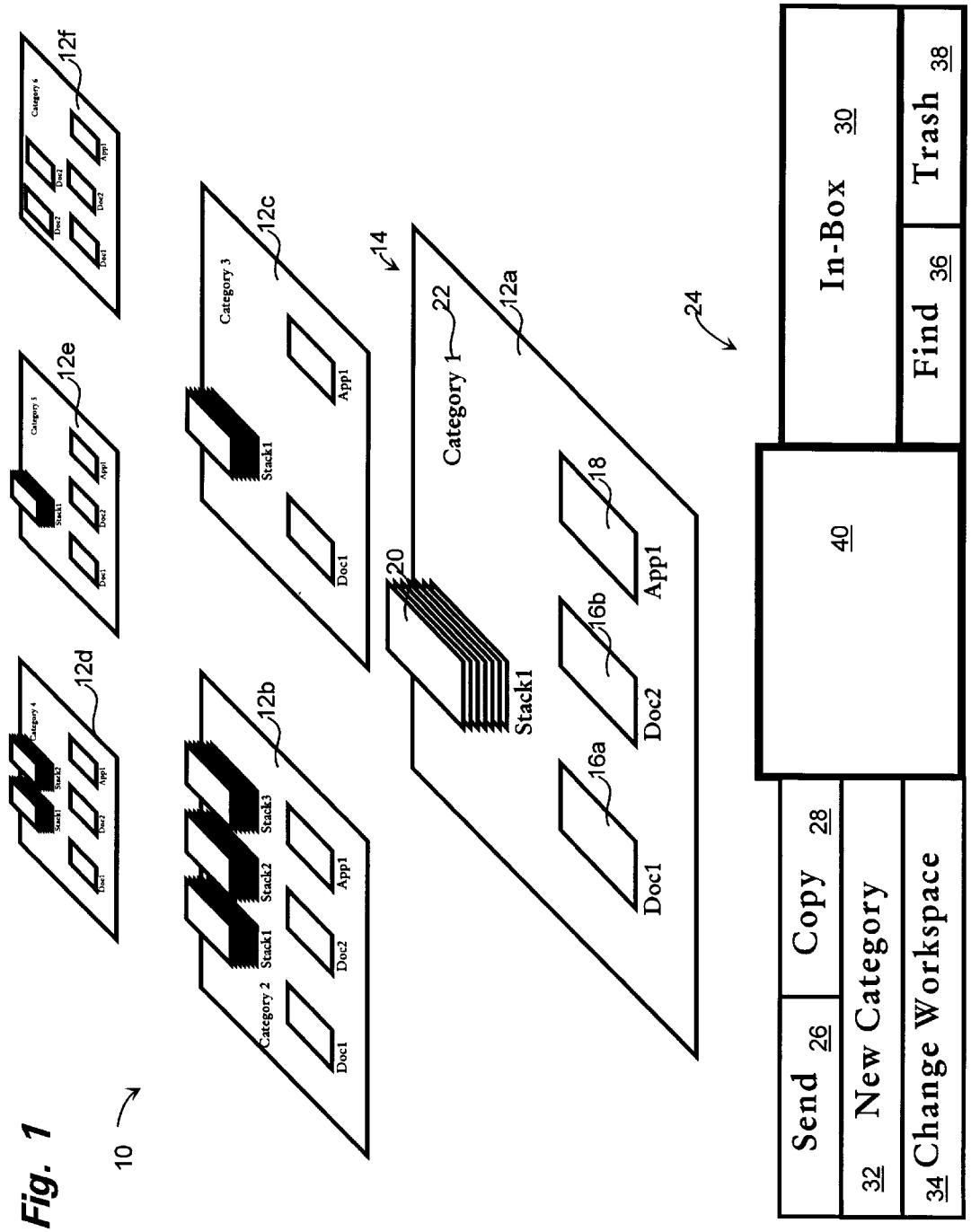
FIG. 1 is a depiction of a three-dimensional user interface.

Referring to FIG. 1, three-dimensional (3-D) user environment 10 provides containers 12 (12a–12f). Each container 12 has a region 14 for holding icons of document files 16, application files 18, and stacks 20. These icons can be conventional icons, larger images, or even animations or digital movies. Icons can also have various sounds associated with them (for example, a resonant bell sound when double-clicked). Each container 12 is labeled by a category 22 (e.g., "Category 1") that can be changed through conventional selection, deletion, and over-writing techniques. Each document, application, and stack icon can be similarly labeled. Regions 14 can have different topologies and structures depending upon the specific container metaphor theme (described below) employed to design the look of 3-D user environment 10. Typically, a region 14 has a substantially planar surface onto which document 16, application 18, and stack 20 icons can be placed.

3-D user environment 10 is depicted as having receding sight-lines, such that some containers (typically those toward the top of the computer display, e.g., containers 12d, 12e, and 12f) are depicted relatively smaller than containers towards the bottom of the display (e.g., container 12a). The sight-lines can be made to converge on any appropriate area of the display, e.g., to a vanishing point or to a horizon line, or to the top of the display. Any number of containers can be displayed at one time: containers can be added, receding farther and farther toward the vanishing point of the displayed environment. All contents of a container shrink appropriately when their container shrinks. When the labels for a category, document, application, or stack can no longer be read because of shrinkage, conventional techniques (such as right-mouse-button interrogation) can display a selected label in larger size to the user. The environment can be pictured as infinite space without walls, or can have walls. It has been found that if walls are used, it is best to have the walled-in environment be "convex", that is, that the walls not converge toward each other but rather away from one another, giving the user the impression of an expansive area of space in which to work.

The foreground of environment 10 is reserved for the active or primary container 12a. This is typically the only container 12 in which files can be moved or opened.

A tool tray 24 can be provided to the user, located conveniently at the bottom of the display. Tool tray 24 can be designed to fit within the particular metaphor theme of the 3-D user environment 10. The tool tray 24 area provides a stable point of reference that remains with the user as the user interacts with 3-D user environment 10. Any number of different implementations of such a stable point of reference can be employed. Tool tray 24 can include tools helpful for the user in manipulating documents and applications. In implementations where multiple users operate the same computer (where each user has his or her own environment having proprietary files and environment set-up), users can communicate and share files through tool tray 24. For example, a particular file can be selected and dragged from the 3-D user environment 10 onto Send button 26, which (after querying for the particular user destination) sends a copy of the file to that user. Received files appear in In-Box 30, and can then be dragged onto an appropriate container 12.

Similarly, files can be copied by dragging and dropping onto the Copy button 28. New categories (and thereby new containers 12) can be created by selecting the New Category button 32. A new blank container 12 emerges and replaces the foreground container 12a. A menu of available categories then can be displayed (e.g., Work, Games, Finance, or Blank), where selection of a particular category automatically populates the new container with relevant applications and documents. Selection of the Blank category creates an empty, untitled container 12 where the user can change its category 22 and populate it with files of the user's choosing.

3-D user environment 10 can be changed by selecting the Change Workspace button 34. Change Workspace button 34 allows the user to change the metaphor theme of the environment, as well as bring alias references into 3-D user environment 10 for an application already installed on the computer but not yet placed within environment 10. Find button 36 allows a user to easily locate a document, application, stack or category within environment 10. Each of these types of files can be dragged to Trash button 38 to be discarded. In one implementation, a container 12 can be discarded without having to discard each of the files it contains. A shelf 40 is provided for the user to place a number of frequently-used application or document icons.

A number of other features can be added to tool tray 24, such as help commands, a homebase button for returning to a central homebase environment (from which a user can enter other user's environments, for example), and computer shutdown commands. An example of a homebase environment can be found in co-pending application Ser. No. 08/583,207 entitled "Home Base Interface" hereby incorporated by reference. Further, icon buttons for removable media can be used to easily and intuitively drag files between such media and 3-D user environment 10.

Figure 2:
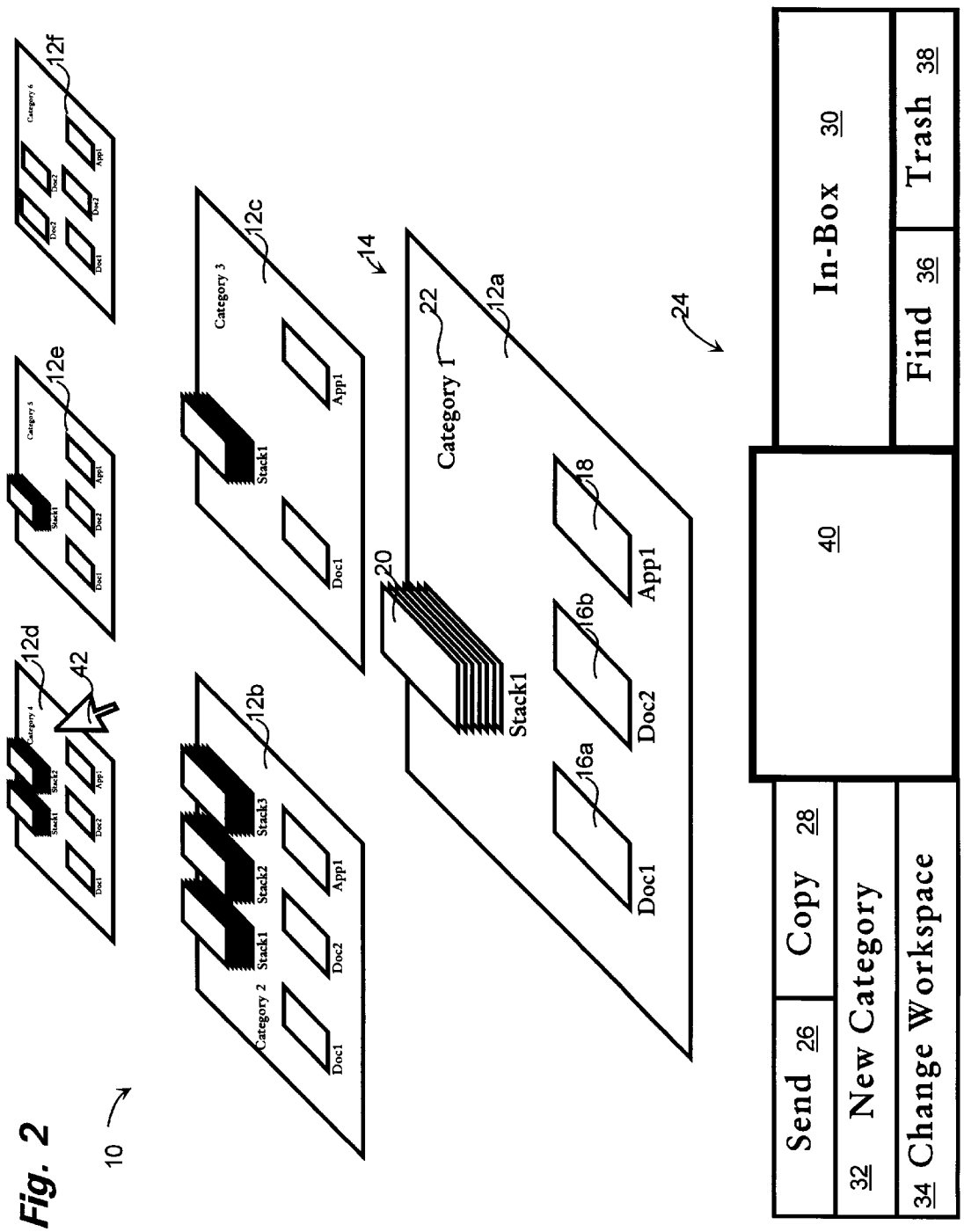
FIGS. 2 and 3 are depictions of a three-dimensional user interface, illustrating container swapping.
Figure 3:
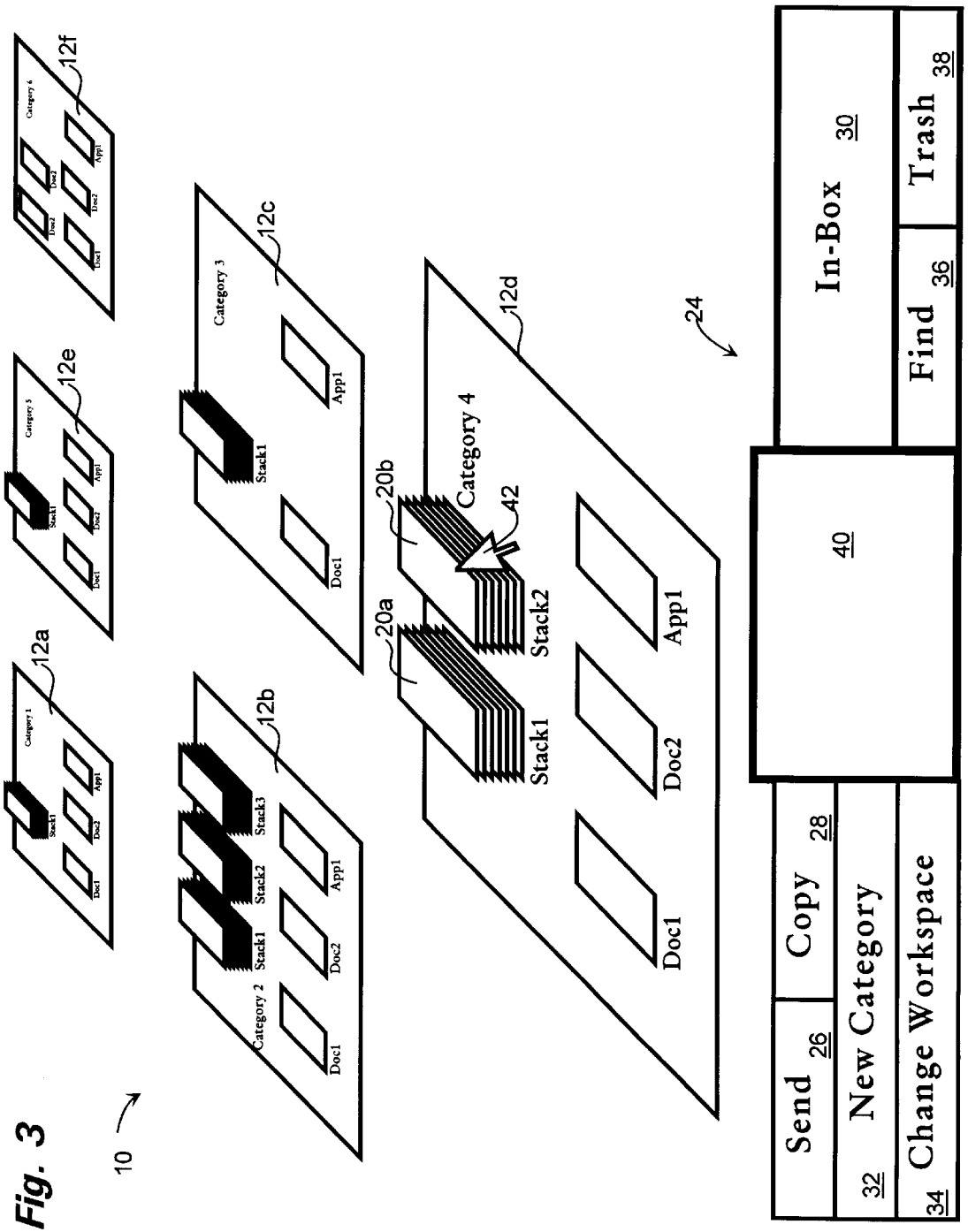

Referring to FIGS. 2 and 3, a background container 12*d* can be brought forward and exchanged with a current foreground container 12*a* by merely single-clicking on the background container 12*d* with mouse cursor 42. As shown in FIG. 3, container 12*d* (labeled "Category 4") is now the foreground container, and container 12*a* has moved to the background position previously held by container 12*d*. Containers 12 can be moved around the environment by clicking and dragging operations. As a container is moved towards the upper portion of the display (the synthetic receding distance of environment 10), it automatically shrinks. A moved container 12 should not obscure the primary container 12 currently occupying the active foreground location, but when a moved container 12 passes through the foreground position, it can be shrunk again to a small icon, allowing it to be dropped onto one of the buttons of tool tray 24 (e.g., Trash button 38, for discarding). By requiring containers to be moved to and from the primary container location of the foreground, 3-D user environment 10 does not require the user to "fly" over a series of containers to find the right container. Such fly-over navigation, where the user moves through the environment, rather than bringing tools he or she needs closer to them, can be very disorienting for some users, even nauseating. 3-D user environment 10 uses a fixed perspective to eliminate such navigation, however this can be exchanged for full navigation as required.

Figure 4:
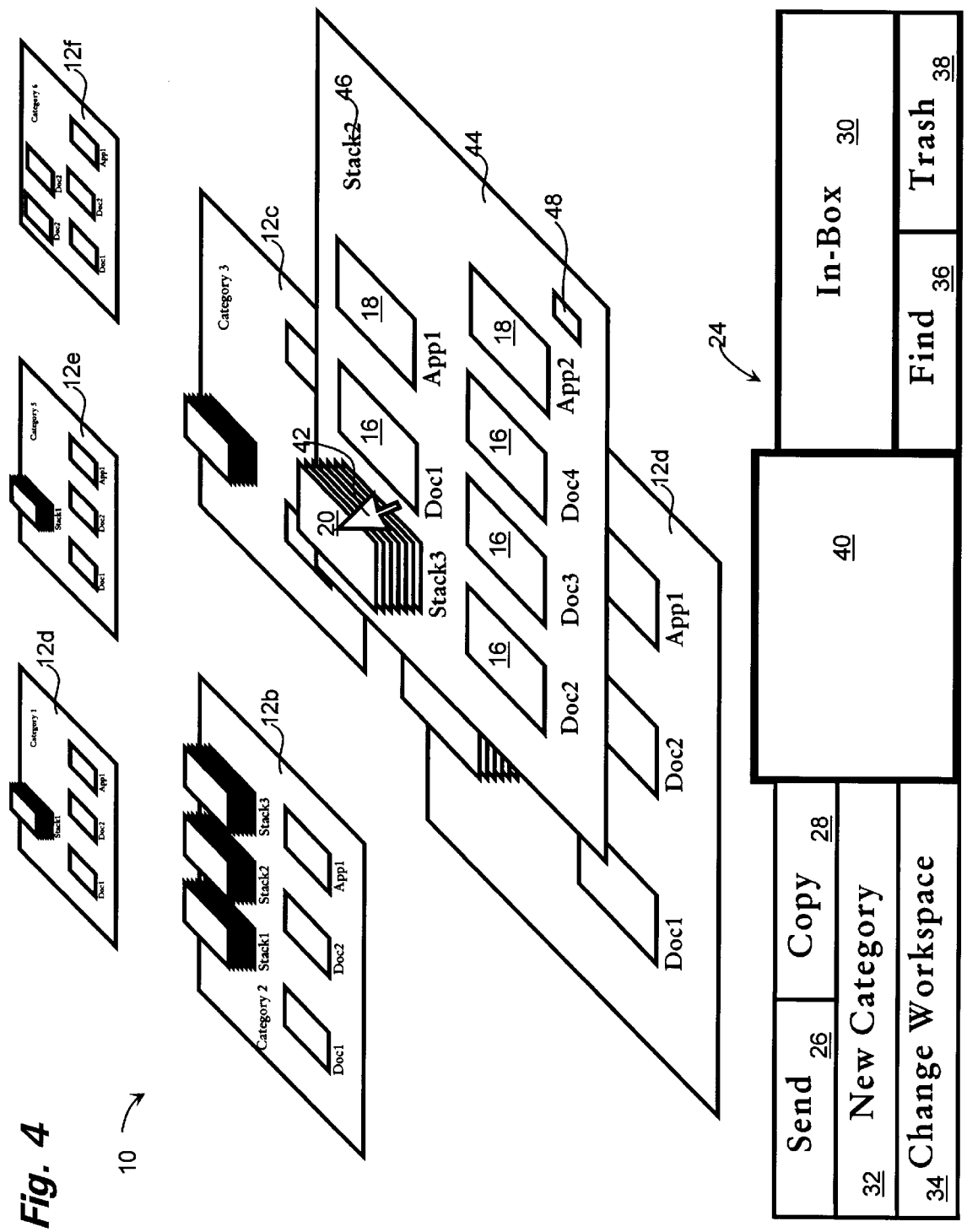
FIG. 4 is a depiction of a three-dimensional user interface, illustrating a sub-container.

Various actions can be performed on or with icons contained with a container 12. Referring to FIGS. 3 and 4, stack 20*b* can be selected with cursor 42 and expanded into sub-container 44 displayed above the original container 12*d* containing stack 20*b*. Sub-container 44 can be configured to resemble the same shape as containers 12, and can contain further documents 16, applications 18, and stacks 20. These nested stacks 20 can be opened, in turn, into further sub-sub-containers. Some mode of selection, e.g., double-clicking on the surface of sub-container 44, can restore the contents of sub-container 44 to the icon of stack 20*b*. Sub-container 44 is labeled with the name of stack 20*b* (e.g., "Stack2") which can be selected and changed like all other icon labels. Stacks 20 can also be configured to have a stack button 48 on their displayed sub-containers 44. Selecting the stack button 48 produces a directory tree list of all files located within the stack for easy searching.

Stack icons 20 can be depicted to display (up to a limit) the number of files contained within them. For example, a stack having 3 documents can be represented by 3 sheets of stacked paper. Beyond some limit (e.g., 5 documents) the stack would be represented by that limit of documents. Stacks can be created by dragging and dropping one document onto another, or one application onto another application or onto a document (typically, in many conventional OSs, dragging a document onto an application opens the document using the application). As described below, documents, applications, and other stacks can also be added to an opened stack (displayed as a sub-container) by dragging and moving. Stacks themselves can be moved, dragged, and dropped just like other file icons.

One simpler embodiment of a 3-D user environment is configured to allow only one level of hierarchy between containers and stacks (that is, there would not be stacks allowed within stacks). An advantage of such a scheme is that certain users do not understand deep hierarchical relationships of memory storage very well. By enforcing only three levels of hierarchy (Category/Stack/File), a user would not have to contend with additional levels. Or, in such a simpler embodiment, the next level down in a directory hierarchy can be displayed as simple Windows folder icons, rather than further stacks. Opening a folder contained within a stack would open a conventional window and display the contents of the folder as the normal OS does.

Figure 5:
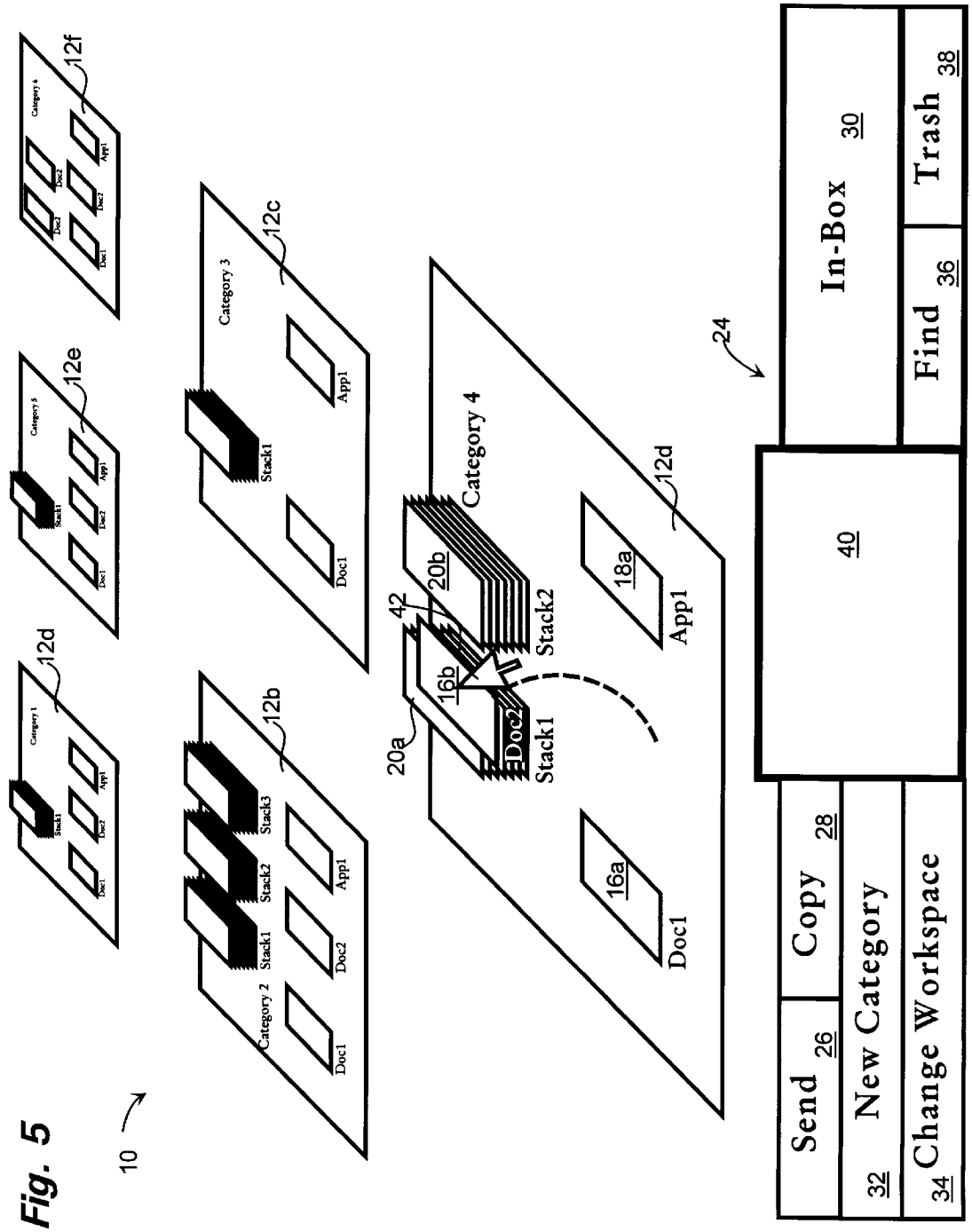
FIG. 5 is a depiction of a three-dimensional user interface, showing a file moved to a stack.
Figure 6:
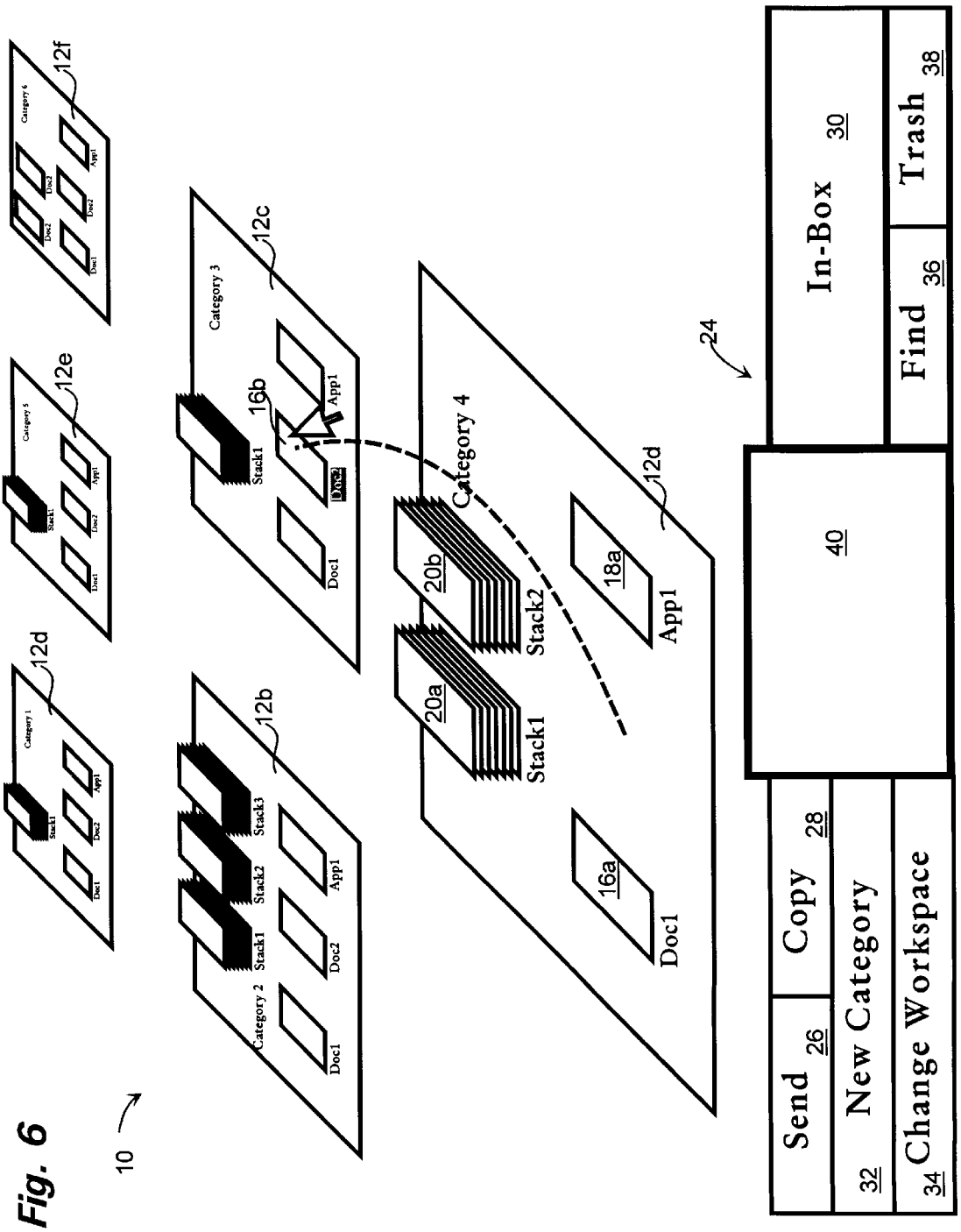
FIG. 6 is a depiction of a three-dimensional user interface, depicting a file moved from one container to another.

Referring to FIGS. 5 and 6, file icons can be moved by clicking and dragging. As an example, a document file icon 16*b* is dragged onto stack 20*a* (where it will be joined to the existing stack). Referring to FIG. 6, file icon 16*b* is dragged from container 12*d* to container 12*c*. Application icons 18 and stack icons 20 can be dragged and moved in the same fashion.

Figure 7:
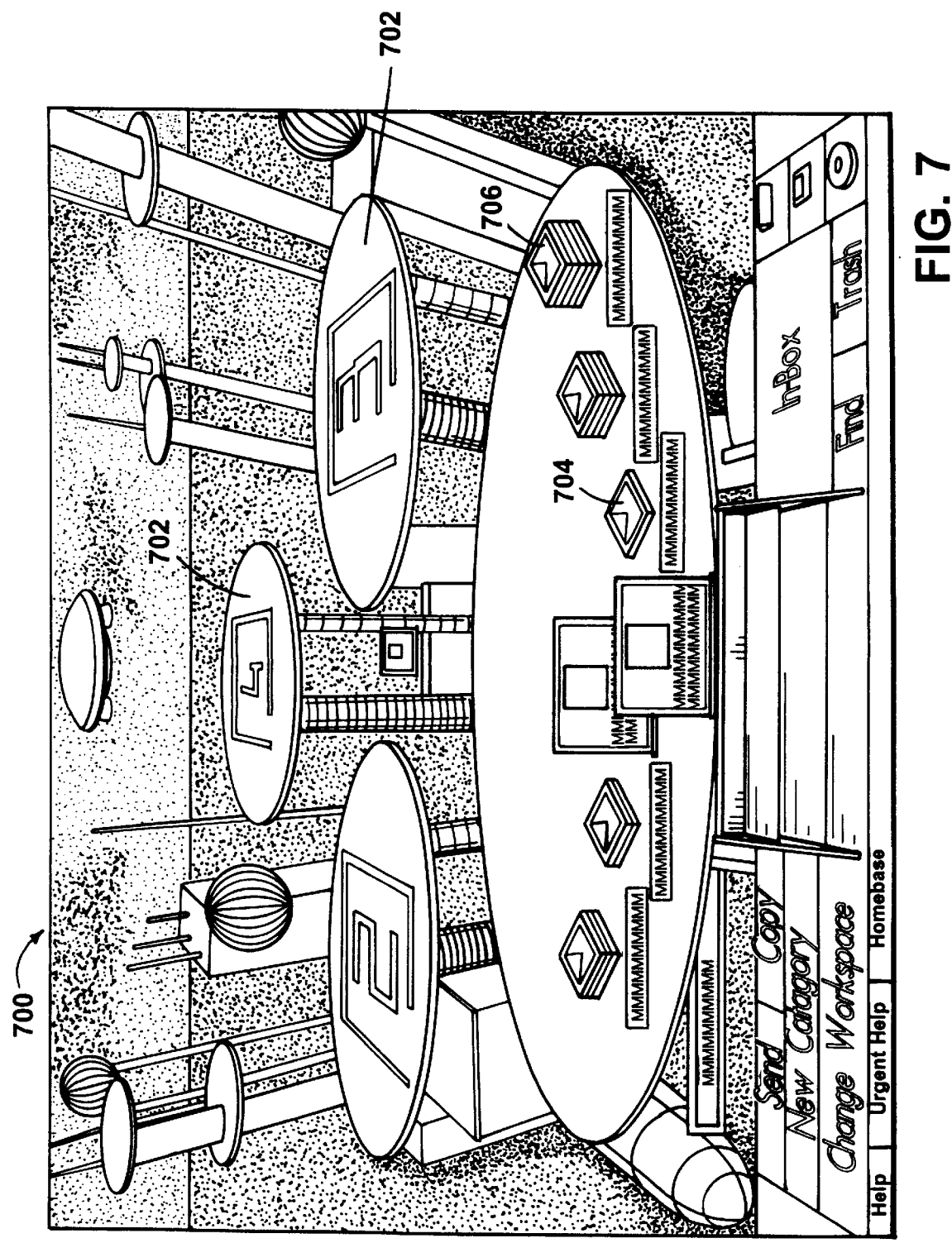
FIGS. 7 through 11 are depictions of different metaphor themes for three-dimensional user interfaces.
Figure 8:
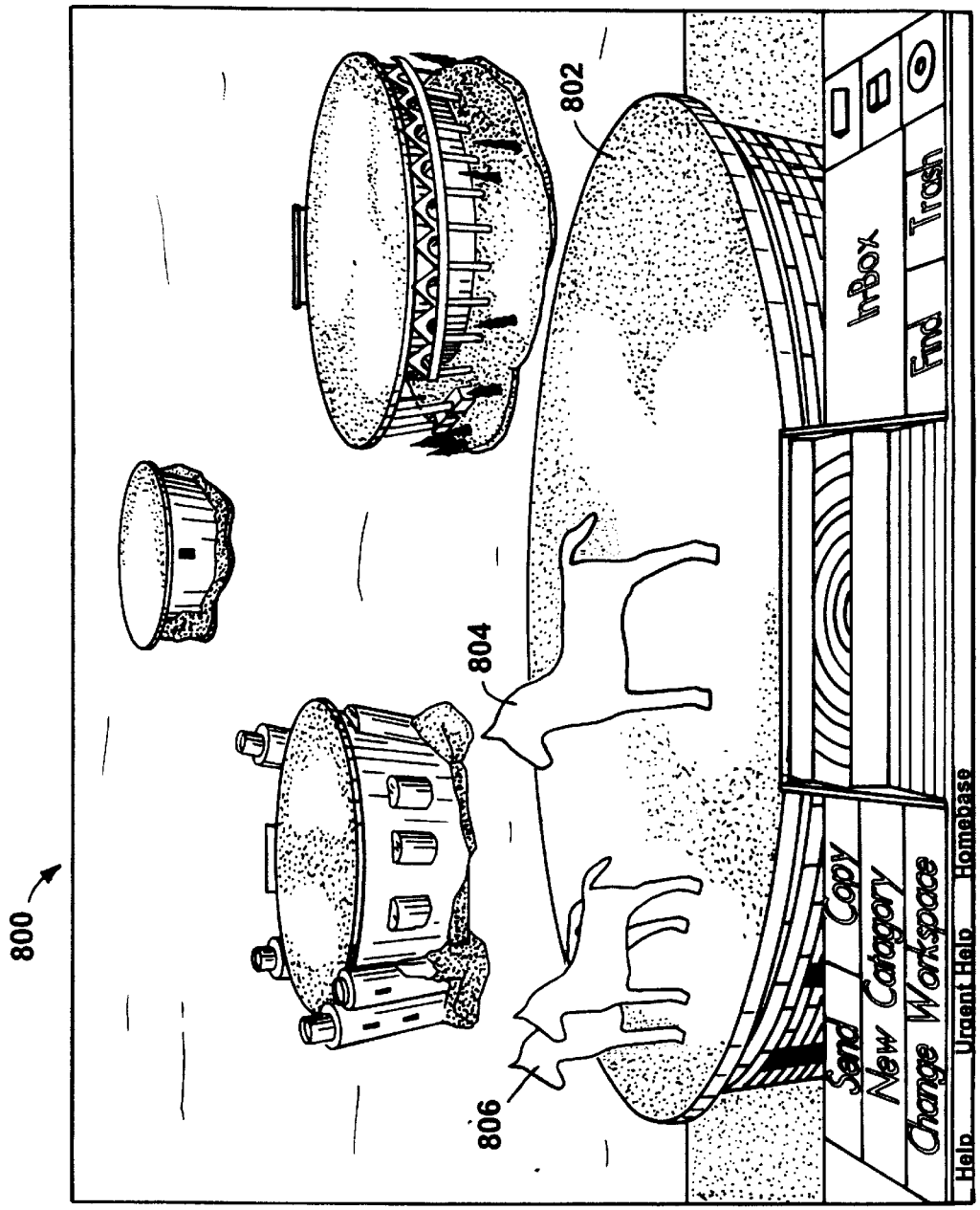
Figure 9:
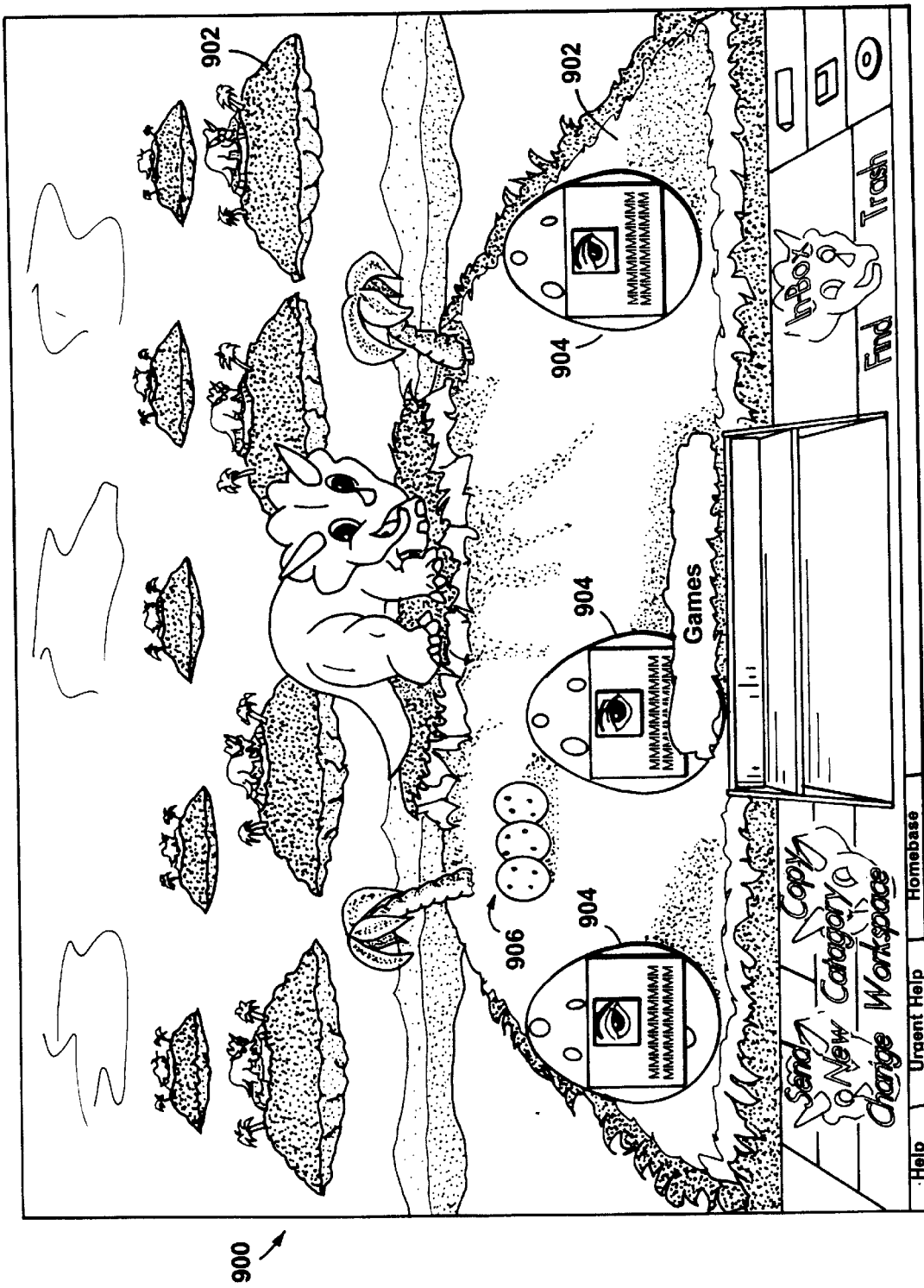

FIGS. 1 through 6 illustrate a basic metaphor theme based upon a typical desk, where the desk has files (represented by icons of document sheets) and stacks of the same types of documents. Referring to FIGS. 7 through 11, different metaphor themes can be employed to display containers, documents, applications, and stacks. In FIG. 7, 3-D user environment 700 is fancifully designed as a space-port, with containers represented by individual floating space-port "mesas" 702, and where file icons are displayed as space-ships 704, and stacks are displayed as clustered spaceships 706. Referring to FIG. 8, containers are depicted as floating islands 802 (either in water or in air) with individual files represented as animals 804, and stacks represented as clusters of animals 806, perhaps feeding around a watering hole. Referring to FIG. 9, a similar land structure 902 can have dinosaur eggs 904 for files and nests of eggs 906 for stacks.

Figure 10:
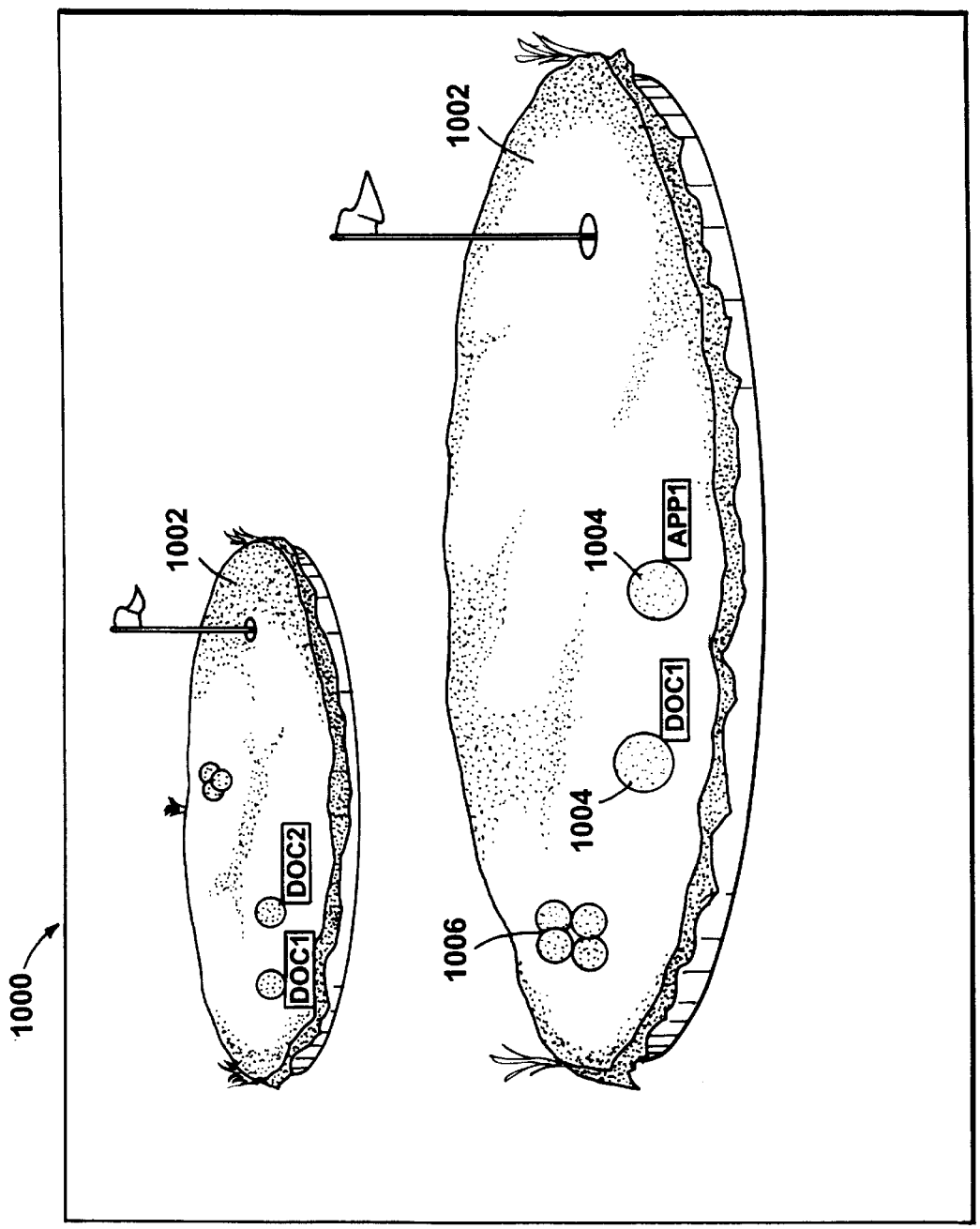
Figure 11:
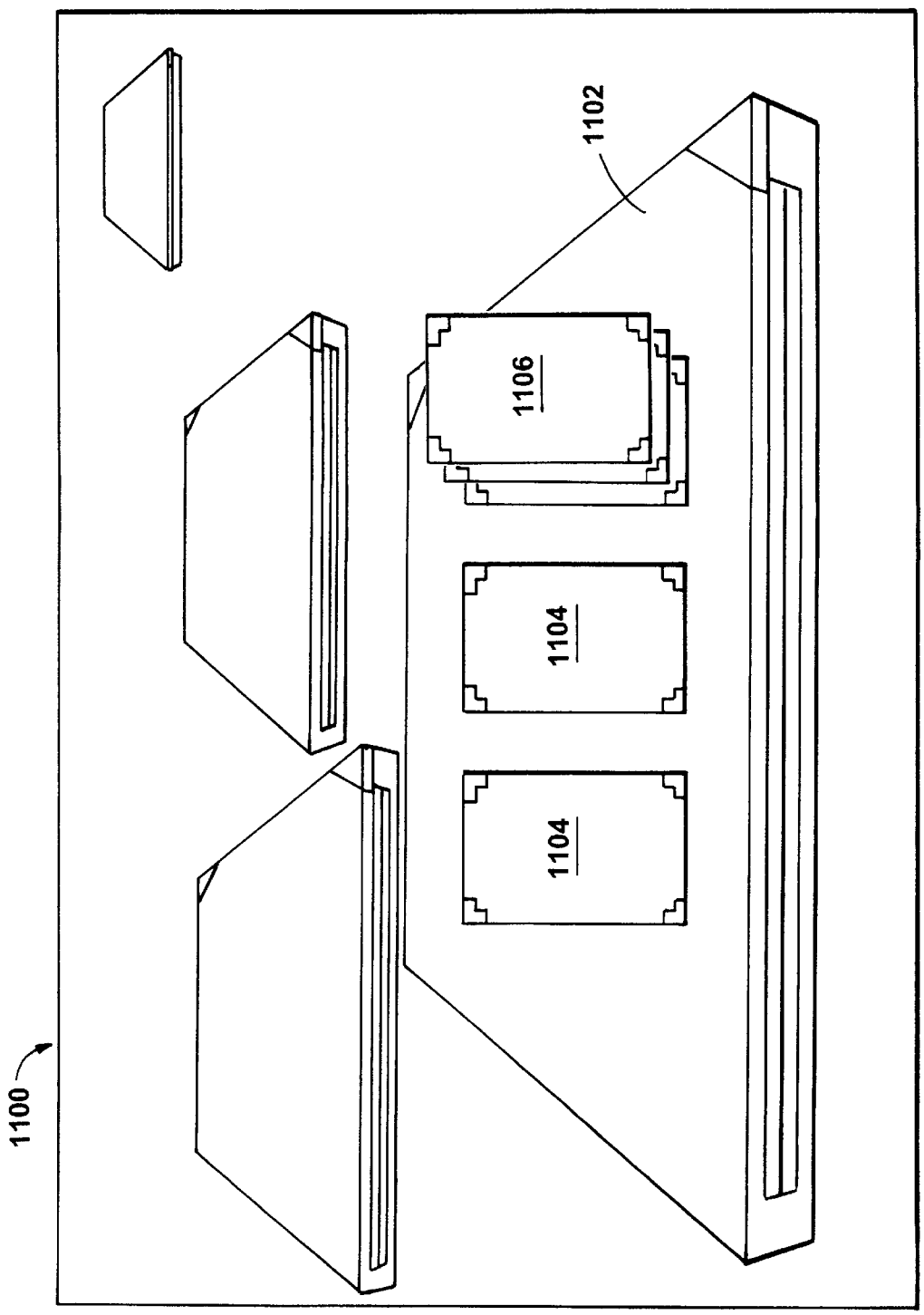

Referring to FIG. 10, containers can be represented by golf course greens 1002, with individual files represented by golf balls 1004, and stacks depicted as stacks of golf balls 1006. Referring to FIG. 11, each container can be depicted as a floating photo album (which can be opened or closed) 1102, where individual files are represented by photographs 1104, and stacks are shown as stacks of photographs 1106.

Figure 12:
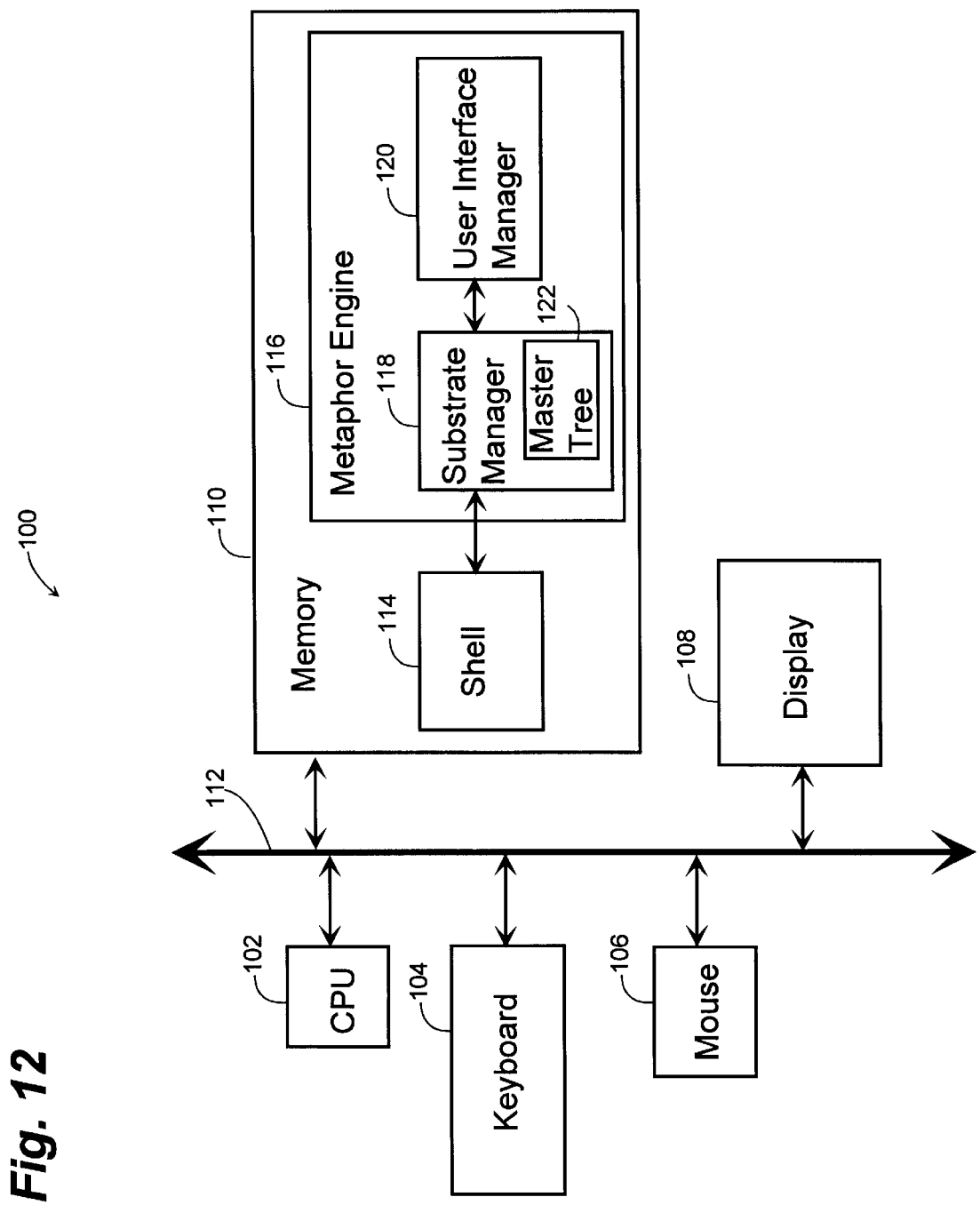
FIG. 12 is a schematic diagram of a computer providing a three-dimensional user environment.

Referring to FIG. 12, 3-D user environment 10 can be developed in software in computer 100 (having CPU 102, keyboard 104, mouse input device 106, display 108, and system memory 110 all coupled by bus 112) as a modular system having two components: a shell 114 and a metaphor engine 116. Shell 114 is an executable application responsible for handling the loading of the proper metaphor for each computer user. Metaphor engine 116 can be an executable file able to load any one of a number of theme resource files for changing the appearance of the 3-D user environment. Using the Windows 95™ operating system as an example, shell 114 would replace the standard Windows 95™ shell program. Shell 114 can be very simple, and hands most of the operation of 3-D user environment 10 over to metaphor engine 116. Shell 114 handles the loading of the proper metaphor for a given user and establishes a communications link between metaphor engine 116 and shell 114, providing some control over aspects of metaphor engine 116 as needed.

Metaphor engine 116 has several components. First, substrate manager 118 builds an internal representation of the file system. Each top-level folder is represented by a category 22 (to be assigned a container 12 within the 3-D user environment), sub-folders are represented by stacks and sub-stacks 20, and files are represented by icons 16 and 18 within the containers. The internal representation built by substrate manager 118 is independent of any particular metaphor by which that internal representation will be displayed to the user. It provides the functional mechanisms for mapping these elements (categories, folders, files) onto graphical elements within a given 3-D user environment metaphor. A master tree 122 stored by substrate manager 118 keeps track of all visual representations of files (applications and documents), containers, and stacks, and is used for building the visual representation and for saving the state of the environment for the next session.

User interface manager 120, a second component of metaphor engine 116, is responsible for displaying on the computer display the visual representation of the file system objects built by substrate manager 118. User interface manager 120 can be constructed as an animation sprite engine, such that it communicates with substrate manager objects and maintains a separate set of lists representing the visual representations of the objects. By splitting tasks between substrate manager 118 (that builds master tree 122) and user interface manager 120 (that displays the results of master tree 122), the visual appearance of 3-D user environment 10 need not be updated instantaneously with underlying changes in the organization of the files actually stored within the computer. Such instantaneous updating, which on some occasions is necessary, on other occasions can be confusing.

Other embodiments are within the scope of the claims. For example, any number of different metaphor themes can be employed to convey a three-dimensional user environment. The environment can be developed within or for any graphical operating system. The changing in size of containers and their contained files can be inverted, growing larger as they approach the top of the screen. Containers do not need to have a perspectival aspect to their shape: they can be simple rectangles that grow smaller as they approach the top of the display. Any number of other convenient command buttons or other dialog selection tools can be added to the tool tray.

What is claimed is:

1. A method for displaying information about computer files to a user on a display in an environment simulating three-dimensional space comprising:
   displaying a category of files as a container having a size related to its distance from a predefined portion of the display environment, wherein the category of files can be brought closer to or farther away from the user while the user remains fixed in position within the simulated three-dimensional environment, by changing the size of the container relative to the sizes of other containers in the simulated space.

2. The method of claim 1 further comprising:
   displaying an icon of a file belonging to the category of files on a region of the container.

3. The method of claim 2 wherein the icon of the file has a size related to its distance from the predefined portion of the display environment.

4. The method of claim 3 wherein the size of the icon of the file increases with distance from the predefined portion of the display environment.

5. The method of claim 1 wherein the size increases with distance from the predefined portion of the display environment.

6. The method of claim 1 wherein the predefined portion of the display environment is the top of the display environment.

7. The method of claim 1 wherein the predefined portion of the display is an imaginary horizon line of the display environment.

8. The method of claim 1 wherein the simulated three-dimensional environment is arranged so that its simulated boundaries appear to extend convexly outwards away from the user.

9. The method of claim 1 wherein a region of the container is rendered to appear substantially planar.

10. The method of claim 9 wherein the substantially planar region is on what appears to be the upper side of the container.

11. The method of claim 1 wherein the file comprises a document.

12. The method of claim 1 wherein the file comprises an executable program.

13. The method of claim 1 wherein two files are displayed on a region of the container, where the first file comprises a document and the second file comprises an executable program.

14. The method of claim 13 wherein a user can operate upon the first file with the second file by dragging the first file to the second file.

15. The method of claim 1 further comprising:
   displaying a subcategory of files as a stack on a region of the container.

16. The method of claim 15 further comprising:
   opening the stack, in response to the user selecting the stack, and displaying the stack as a sub-container, icons of the files of the stack being displayed on a region of the sub-container.

17. The method of claim 16 wherein the region of the sub-container is rendered to appear substantially planar.

18. The method of claim 15 wherein the stack resembles a stack of papers.

19. The method of claim 15 wherein the stack resembles a stack of photographs.

20. The method of claim 1 further comprising:
   displaying categories of files as similarly-configured containers, the containers having sizes related to their respective distances from the predefined portion of the display environment.

21. The method of claim 20 wherein a file can be moved from a first container to a second container in response to user selection.

22. The method of claim 21 wherein the larger container is the largest container.

23. The method of claim 21 wherein the selected container is the smaller container.

24. The method of claim 21 wherein the user selection comprises selecting the file located on the first container and dragging the file to the second container.

25. The method of claim 21 wherein the user selection comprises selecting the file located on the first container and selecting the second container.

26. The method of claim 20 wherein a larger container exchanges position and size with a smaller container in response to the user selecting one of the containers.

27. The method of claim 1 wherein the container resembles a desk and the file resembles a sheet of paper.

28. The method of claim 1 wherein the container resembles a photo album and the file resembles a photograph.

29. A method for displaying information about computer files to a user on a display in an environment simulating three-dimensional space comprising:

displaying a category of files as a container having a size related to its distance from a predefined portion of the display environment, wherein the container resembles a space port and a file resembles a space ship.

30. The method of claim 29 further comprising displaying a subcategory of files as a stack on a region of the container, wherein the stack resembles a cluster of space ships.

31. A method for displaying information about computer files to a user on a display in an environment simulating three-dimensional space comprising:

displaying a category of files as a container having a size related to its distance from a predefined portion of the display environment, wherein the container resembles a piece of land and a file resembles an animal.

32. The method of claim 31 further comprising displaying a subcategory of files as a stack on a region of the container, wherein the stack resembles a cluster of animals.

33. A method for displaying information about computer files to a user on a display in an environment simulating three-dimensional space comprising:

displaying a category of files as a container having a size related to its distance from a predefined portion of the display environment, wherein the container resembles a piece of land and a file resembles an egg.

34. The method of claim 33 further comprising displaying a subcategory of files as a stack on a region of the container, wherein the stack resembles a nest of eggs.

35. A method for displaying information about computer files to a user on a display in an environment simulating three-dimensional space comprising:

displaying a category of files as a container having a size related to its distance from a predefined portion of the display environment, wherein the container resembles a golf course green and a file resembles a golf ball.

36. The method of claim 35 further comprising displaying a subcategory of files as a stack on a region of the container, wherein the stack resembles a cluster of golf balls.

37. A method for displaying information about computer files to a user on a display in an environment simulating three-dimensional space comprising:

displaying a category of files as a container, the container having a size related to its distance from a predefined portion of the display environment, wherein the category of files can be brought closer to or farther away from the user while the user remains fixed in position within the simulated three-dimensional environment, by changing the size of the container relative to the sizes of other containers in the simulated space;

displaying an icon of a file belonging to the category of files on a region of the container; and displaying a subcategory of files as a stack on a region of the container, where the stack opens in response to the user selecting the stack, and displays the stack as a sub-container, icons of the files of the stack displayed on a region of sub-container.

38. Apparatus for displaying information about computer files to a user on a display in an environment simulating three-dimensional space comprising:

a shell program stored in a memory of the computer; and a metaphor engine stored in a memory of the computer and coupled to the shell program, the metaphor engine displaying a category of files on the display as a container, the container having a size related to its distance from a predefined portion of the display environment, wherein the category of files can be brought closer to or farther away from the user while the user remains fixed in position within the simulated three-dimensional environment, by changing the size of the container relative to the sizes of other containers in the simulated space.

39. The apparatus of claim 38 wherein the metaphor engine further comprises a substrate manager that builds an internal representation of the file system and a user interface manager that displays the internal representation of the file system on the display.

40. The apparatus of claim 39 wherein the internal representation of the file system comprises a master tree.

41. The apparatus of claim 38 wherein the metaphor engine further displays an icon of a file belonging to the category of files on a region of the container.

42. The apparatus of claim 38 wherein the size increases with distance from the predefined portion of the display environment.

43. The apparatus of claim 38 wherein the metaphor engine further displays a subcategory of files as a stack on a region of the container.

44. The apparatus of claim 43 wherein the metaphor engine further opens the stack, in response to the user selecting the stack, and displays the stack as a sub-container, icons of the files of the stack displayed on a region of the sub-container.

* * * * *